(12) United States Patent
Raichelgauz et al.

(10) Patent No.: US 9,798,795 B2
(45) Date of Patent: Oct. 24, 2017

(54) METHODS FOR IDENTIFYING RELEVANT METADATA FOR MULTIMEDIA DATA OF A LARGE-SCALE MATCHING SYSTEM

(75) Inventors: Igal Raichelgauz, Herzelia (IL); Karina Odinaev, Haifa (IL); Yehoshua Y Zeevi, Haifa (IL)

(73) Assignee: Cortica, Ltd., Tel Aviv (IL)

( * ) Notice: Subject to any disclaimer, the term of this patent is extended or adjusted under 35 U.S.C. 154(b) by 1164 days.

(21) Appl. No.: 12/348,888

(22) Filed: Jan. 5, 2009

(65) Prior Publication Data

US 2009/0112864 A1    Apr. 30, 2009

Related U.S. Application Data

(63) Continuation-in-part of application No. 12/084,150, filed as application No. PCT/IL2006/001235 on Oct. (Continued)

(30) Foreign Application Priority Data

Oct. 26, 2005  (IL) ........................................ 171577
Jan. 29, 2006  (IL) ........................................ 173409
Aug. 21, 2007  (IL) ........................................ 185414

(51) Int. Cl.
*G06F 17/00* (2006.01)
*G06F 17/30* (2006.01)
(Continued)

(52) U.S. Cl.
CPC .... *G06F 17/30595* (2013.01); *G06F 17/3002* (2013.01); *G06F 17/30026* (2013.01);
(Continued)

(58) Field of Classification Search
CPC ......... G06F 17/30742; G06F 17/30047; G06F 17/30825; G06F 17/30799; G06F 17/30787; G06F 17/30796
(Continued)

(56) References Cited

U.S. PATENT DOCUMENTS 4,972,363 A   11/1990   Nguyen et al.
5,745,678 A    4/1998   Herzberg et al.
(Continued)

FOREIGN PATENT DOCUMENTS

WO   02/031764        4/2002
WO   2005027457 A1    3/2005
WO   2007/0049282     5/2007

OTHER PUBLICATIONS

"Image signature robust to caption superimposition for video sequence identification" Kota Iwamoto, 2006.*
(Continued)

*Primary Examiner* — Truong Vo
(74) *Attorney, Agent, or Firm* — M&B IP Analysts, LLC

(57) ABSTRACT

A method for associate metadata to a multimedia content based on finding matches to similar multimedia content. A given input multimedia content is matched to at least another multimedia content with corresponding metadata. Upon determination of a match, the corresponding metadata is used as metadata of the given multimedia content. When a large number of multimedia data is compared a ranked list of metadata is provided. The most appropriate metadata is associated to the given multimedia content based on various criteria. The method can be implemented in any applications which involve large-scale content-based clustering, recognition and classification of multimedia data, such as, content-tracking, video filtering, multimedia taxonomy generation, video fingerprinting, speech-to-text, audio classification, object recognition, video search and any other application requiring content-based signatures generation and matching for large content volumes such as, web and other large-scale databases.

21 Claims, 4 Drawing Sheets

Related U.S. Application Data 26, 2006, now Pat. No. 8,655,801, application No. 12/348,888, which is a continuation-in-part of application No. 12/195,863, filed on Aug. 21, 2008, now Pat. No. 8,326,775, which is a continuation-in-part of application No. 12/084,150.

(51) Int. Cl.
*G06K 9/00* (2006.01)
*G10L 15/26* (2006.01)
*G10L 15/32* (2013.01)

(52) U.S. Cl.
CPC .. *G06F 17/30047* (2013.01); *G06F 17/30743* (2013.01); *G06F 17/30746* (2013.01); *G06F 17/30787* (2013.01); *G06F 17/30796* (2013.01); *G06F 17/30799* (2013.01); *G06K 9/00744* (2013.01); *G10L 15/26* (2013.01); *G10L 15/265* (2013.01); *G10L 15/32* (2013.01)

(58) Field of Classification Search
USPC .................................................. 707/767, 758
See application file for complete search history.

(56) References Cited

U.S. PATENT DOCUMENTS

| | | |
|---|---|---|
| 5,806,061 A | 9/1998 | Chaudhuri et al. |
| 5,852,435 A | 12/1998 | Vigneaux et al. |
| 5,870,754 A | 2/1999 | Dimitrova et al. |
| 5,887,193 A | 3/1999 | Takahashi et al. |
| 5,978,754 A | 11/1999 | Kumano |
| 6,052,481 A | 4/2000 | Grajski et al. |
| 6,076,088 A | 6/2000 | Paik et al. |
| 6,122,628 A | 9/2000 | Castelli et al. |
| 6,144,767 A | 11/2000 | Bottou et al. |
| 6,147,636 A * | 11/2000 | Gershenson ............ G01V 3/12 342/195 |
| 6,240,423 B1 | 5/2001 | Hirata |
| 6,243,375 B1 | 6/2001 | Speicher |
| 6,275,599 B1 | 8/2001 | Adler et al. |
| 6,381,656 B1 | 4/2002 | Shankman |
| 6,411,229 B2 | 6/2002 | Kobayashi |
| 6,422,617 B1 | 7/2002 | Fukumoto et al. |
| 6,507,672 B1 | 1/2003 | Watkins et al. |
| 6,524,861 B1 | 2/2003 | Anderson |
| 6,594,699 B1 | 7/2003 | Sahai et al. |
| 6,611,628 B1 | 8/2003 | Sekiguchi et al. |
| 6,618,711 B1 | 9/2003 | Ananth |
| 6,643,620 B1 | 11/2003 | Contolini et al. |
| 6,643,643 B1 | 11/2003 | Lee et al. |
| 6,751,363 B1 | 6/2004 | Natsev et al. |
| 6,754,435 B2 | 6/2004 | Kim |
| 6,763,519 B1 | 7/2004 | McColl et al. |
| 6,774,917 B1 | 8/2004 | Foote et al. |
| 6,804,356 B1 * | 10/2004 | Krishnamachari ........... 380/201 |
| 6,819,797 B1 | 11/2004 | Smith et al. |
| 6,845,374 B1 | 1/2005 | Oliver et al. |
| 6,901,207 B1 | 5/2005 | Watkins |
| 7,006,689 B2 | 2/2006 | Kasutani |
| 7,013,051 B2 | 3/2006 | Sekiguchi et al. |
| 7,043,473 B1 | 5/2006 | Rassool et al. |
| 7,158,681 B2 | 1/2007 | Persiantsev |
| 7,199,798 B1 | 4/2007 | Echigo et al. |
| 7,260,564 B1 | 8/2007 | Lynn et al. |
| 7,277,928 B2 | 10/2007 | Lennon |
| 7,302,117 B2 | 11/2007 | Sekiguchi et al. |
| 7,313,805 B1 | 12/2007 | Rosin et al. |
| 7,450,740 B2 | 11/2008 | Shah et al. |
| 7,526,607 B1 | 4/2009 | Singh et al. |
| 7,574,668 B2 * | 8/2009 | Nunez et al. ................ 715/772 |
| 7,577,656 B2 | 8/2009 | Kawai et al. |
| 7,694,318 B2 | 4/2010 | Eldering et al. |
| 7,836,054 B2 | 11/2010 | Kawai et al. |
| 7,920,894 B2 | 4/2011 | Wyler |
| 7,921,107 B2 | 4/2011 | Chang et al. |
| 7,933,407 B2 | 4/2011 | Keidar et al. |
| 7,974,994 B2 | 7/2011 | Li et al. |
| 7,987,194 B1 | 7/2011 | Walker et al. |
| 7,991,715 B2 | 8/2011 | Schiff et al. |
| 8,000,655 B2 | 8/2011 | Wang et al. |
| 8,036,893 B2 | 10/2011 | Reich |
| 8,098,934 B2 | 1/2012 | Vincent et al. |
| 8,266,185 B2 | 9/2012 | Raichelgauz et al. |
| 8,312,031 B2 | 11/2012 | Raichelgauz et al. |
| 8,316,005 B2 | 11/2012 | Moore |
| 8,326,775 B2 | 12/2012 | Raichelgauz et al. |
| 8,655,801 B2 | 2/2014 | Raichelgauz et al. |
| 8,677,377 B2 | 3/2014 | Cheyer et al. |
| 8,682,667 B2 | 3/2014 | Haughay |
| 8,688,446 B2 | 4/2014 | Yanagihara |
| 8,706,503 B2 | 4/2014 | Cheyer et al. |
| 8,775,442 B2 | 7/2014 | Moore et al. |
| 8,868,619 B2 | 10/2014 | Raichelgauz et al. |
| 8,880,539 B2 | 11/2014 | Raichelgauz et al. |
| 8,880,566 B2 | 11/2014 | Raichelgauz et al. |
| 8,898,568 B2 | 11/2014 | Bull et al. |
| 8,922,414 B2 | 12/2014 | Raichelgauz et al. |
| 8,959,037 B2 | 2/2015 | Raichelgauz et al. |
| 8,990,125 B2 | 3/2015 | Raichelgauz et al. |
| 9,009,086 B2 | 4/2015 | Raichelgauz et al. |
| 9,031,999 B2 | 5/2015 | Raichelgauz et al. |
| 9,087,049 B2 | 7/2015 | Raichelgauz et al. |
| 9,104,747 B2 | 8/2015 | Raichelgauz et al. |
| 9,191,626 B2 | 11/2015 | Raichelgauz et al. |
| 9,197,244 B2 | 11/2015 | Raichelgauz et al. |
| 9,218,606 B2 | 12/2015 | Raichelgauz et al. |
| 9,235,557 B2 | 1/2016 | Raichelgauz et al. |
| 9,256,668 B2 | 2/2016 | Raichelgauz et al. |
| 9,330,189 B2 | 5/2016 | Raichelgauz et al. |
| 2001/0019633 A1 | 9/2001 | Tenze et al. |
| 2001/0056427 A1 | 12/2001 | Yoon et al. |
| 2002/0010682 A1 | 1/2002 | Johnson |
| 2002/0059580 A1 | 5/2002 | Kalker et al. |
| 2002/0072935 A1 | 6/2002 | Rowse et al. |
| 2002/0087530 A1 | 7/2002 | Smith et al. |
| 2002/0107827 A1 | 8/2002 | Benitez-Jimenez et al. |
| 2002/0123928 A1 | 9/2002 | Eldering et al. |
| 2002/0126872 A1 | 9/2002 | Brunk et al. |
| 2002/0143976 A1 * | 10/2002 | Barker .................... H04L 29/06 709/231 |
| 2002/0163532 A1 | 11/2002 | Thomas et al. |
| 2002/0178410 A1 | 11/2002 | Haitsma et al. |
| 2003/0028660 A1 | 2/2003 | Igawa et al. |
| 2003/0078766 A1 | 4/2003 | Appelt et al. |
| 2003/0086627 A1 | 5/2003 | Berriss et al. |
| 2003/0105739 A1 | 6/2003 | Essafi et al. |
| 2003/0126147 A1 | 7/2003 | Essafi et al. |
| 2003/0182567 A1 | 9/2003 | Barton et al. |
| 2003/0191764 A1 * | 10/2003 | Richards ...................... 707/100 |
| 2003/0200217 A1 | 10/2003 | Ackerman |
| 2004/0025180 A1 | 2/2004 | Begeja et al. |
| 2004/0068510 A1 | 4/2004 | Hayes et al. |
| 2004/0107181 A1 | 6/2004 | Rodden |
| 2004/0111465 A1 | 6/2004 | Chuang et al. |
| 2004/0117367 A1 | 6/2004 | Smith et al. |
| 2004/0128142 A1 | 7/2004 | Whitham |
| 2004/0128511 A1 | 7/2004 | Sun et al. |
| 2004/0133927 A1 | 7/2004 | Sternberg et al. |
| 2004/0153426 A1 | 8/2004 | Nugent |
| 2004/0215663 A1 | 10/2004 | Liu et al. |
| 2004/0249779 A1 | 12/2004 | Nauck et al. |
| 2004/0260688 A1 | 12/2004 | Gross |
| 2005/0144455 A1 * | 6/2005 | Haitsma ............ G06F 17/30758 713/176 |
| 2005/0172130 A1 | 8/2005 | Roberts |
| 2005/0177372 A1 | 8/2005 | Wang et al. |
| 2006/0013451 A1 * | 1/2006 | Haitsma ............ G06F 17/3002 382/124 |
| 2006/0020860 A1 | 1/2006 | Tardif et al. |
| 2006/0026203 A1 | 2/2006 | Tan et al. |
| 2006/0031216 A1 * | 2/2006 | Semple et al. .................... 707/4 |

(56) References Cited

U.S. PATENT DOCUMENTS

| | | |
|---|---|---|
| 2006/0048191 A1 | 3/2006 | Xiong |
| 2006/0064037 A1 | 3/2006 | Shalon et al. |
| 2006/0143674 A1 | 6/2006 | Jones et al. |
| 2006/0153296 A1* | 7/2006 | Deng ............... 375/240.12 |
| 2006/0159442 A1 | 7/2006 | Kim et al. |
| 2006/0173688 A1 | 8/2006 | Whitham |
| 2006/0184638 A1 | 8/2006 | Chua et al. |
| 2006/0204035 A1* | 9/2006 | Guo et al. ............... 382/103 |
| 2006/0236343 A1 | 10/2006 | Chang |
| 2006/0242139 A1 | 10/2006 | Butterfield et al. |
| 2006/0242554 A1 | 10/2006 | Gerace et al. |
| 2006/0248558 A1 | 11/2006 | Barton et al. |
| 2006/0253423 A1 | 11/2006 | McLane et al. |
| 2007/0009159 A1 | 1/2007 | Fan |
| 2007/0042757 A1 | 2/2007 | Jung et al. |
| 2007/0067682 A1 | 3/2007 | Fang |
| 2007/0071330 A1* | 3/2007 | Oostveen ........ G06F 17/30743 382/228 |
| 2007/0074147 A1 | 3/2007 | Wold |
| 2007/0130159 A1 | 6/2007 | Gulli et al. |
| 2007/0168413 A1 | 7/2007 | Barletta et al. |
| 2007/0195987 A1 | 8/2007 | Rhoads |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0255785 A1 | 11/2007 | Hayashi et al. |
| 2007/0268309 A1 | 11/2007 | Tanigawa et al. |
| 2007/0294295 A1* | 12/2007 | Finkelstein et al. ...... 707/104.1 |
| 2008/0046406 A1 | 2/2008 | Seide et al. |
| 2008/0049629 A1 | 2/2008 | Morrill |
| 2008/0072256 A1 | 3/2008 | Boicey et al. |
| 2008/0091527 A1 | 4/2008 | Silverbrook et al. |
| 2008/0163288 A1* | 7/2008 | Ghosal et al. .............. 725/31 |
| 2008/0165861 A1 | 7/2008 | Wen et al. |
| 2008/0201299 A1* | 8/2008 | Lehikoinen et al. ........... 707/3 |
| 2008/0204706 A1 | 8/2008 | Magne et al. |
| 2008/0228995 A1 | 9/2008 | Tan et al. |
| 2008/0253737 A1 | 10/2008 | Kimura et al. |
| 2008/0270373 A1 | 10/2008 | Oostveen et al. |
| 2008/0313140 A1 | 12/2008 | Pereira et al. |
| 2009/0013414 A1 | 1/2009 | Washington et al. |
| 2009/0089587 A1* | 4/2009 | Brunk et al. ............... 713/176 |
| 2009/0092375 A1* | 4/2009 | Berry et al. ................ 386/95 |
| 2009/0119157 A1 | 5/2009 | Dulepet |
| 2009/0148045 A1 | 6/2009 | Lee et al. |
| 2009/0172030 A1 | 7/2009 | Schiff et al. |
| 2009/0175538 A1 | 7/2009 | Bronstein et al. |
| 2009/0245573 A1 | 10/2009 | Saptharishi et al. |
| 2009/0245603 A1 | 10/2009 | Koruga et al. |
| 2009/0253583 A1 | 10/2009 | Yoganathan |
| 2009/0277322 A1 | 11/2009 | Cai et al. |
| 2010/0042646 A1 | 2/2010 | Raichelgauz et al. |
| 2010/0082684 A1 | 4/2010 | Churchill et al. |
| 2010/0104184 A1 | 4/2010 | Bronstein et al. |
| 2010/0162405 A1 | 6/2010 | Cook et al. |
| 2010/0173269 A1 | 7/2010 | Puri et al. |
| 2010/0268524 A1 | 10/2010 | Nath et al. |
| 2010/0306193 A1 | 12/2010 | Pereira et al. |
| 2010/0318493 A1 | 12/2010 | Wessling |
| 2010/0322522 A1 | 12/2010 | Wang et al. |
| 2011/0052063 A1 | 3/2011 | McAuley et al. |
| 2011/0055585 A1 | 3/2011 | Lee |
| 2011/0145068 A1 | 6/2011 | King et al. |
| 2011/0202848 A1 | 8/2011 | Ismalon |
| 2011/0246566 A1 | 10/2011 | Kashef et al. |
| 2011/0251896 A1 | 10/2011 | Impollonia et al. |
| 2011/0313856 A1 | 12/2011 | Cohen et al. |
| 2012/0110043 A1* | 5/2012 | Cavet et al. ................ 707/825 |
| 2012/0131454 A1 | 5/2012 | Shah |
| 2012/0150890 A1 | 6/2012 | Jeong et al. |
| 2012/0167133 A1 | 6/2012 | Carroll et al. |
| 2012/0197857 A1 | 8/2012 | Huang et al. |
| 2012/0330869 A1 | 12/2012 | Durham |
| 2013/0031489 A1 | 1/2013 | Gubin et al. |
| 2013/0067035 A1 | 3/2013 | Amanat et al. |
| 2013/0086499 A1 | 4/2013 | Dyor et al. |
| 2013/0104251 A1 | 4/2013 | Moore et al. |
| 2013/0173635 A1 | 7/2013 | Sanjeev |
| 2013/0325550 A1 | 12/2013 | Varghese et al. |
| 2013/0332951 A1 | 12/2013 | Gharaat et al. |
| 2014/0019264 A1 | 1/2014 | Wachman et al. |
| 2014/0147829 A1 | 5/2014 | Jerauld |
| 2014/0193077 A1 | 7/2014 | Shiiyama et al. |
| 2015/0289022 A1 | 10/2015 | Gross |

OTHER PUBLICATIONS

"Content-Based Retrieval of Music and Audio" 1997 Jonathan, 1999.*

"Generating robust digital signature for image/video authentication" Ching-Yung, 1998.*

Raichelgauz, I. et al.: "Co-evolutionary Learning in Liquid Architectures", Lecture Notes in Computer Science, [Online] vol. 3512, Jun. 21, 2005 (Jun. 21, 2005), pp. 241-248, XP019010280 Springer Berlin / Heidelberg ISSN: 1611-3349 ISBN: 978-3-540-26208-4.

Jaeger, H.: "The "echo state" approach to analysing and training recurrent neural networks", GMD Report, No. 148, 2001, pp. 1-43, XP002466251 German National Research Center for Information Technology.

Verstraeten et al.: "Isolated word recognition with the Liquid State Machine: a case study", Information Processing Letters, Amsterdam, NL, vol. 95, No. 6, Sep. 30, 2005 (Sep. 30, 2005), pp. 521-528, XP005028093 ISSN: 0020-0190.

Zeevi, Y. et al.: "Natural Signal Classification by Neural Cliques and Phase-Locked Attractors", IEEE World Congress on Computational Intelligence, IJCNN2006, Vancouver, Canada, Jul. 2006 (Jul. 2006), XP002466252.

Natsclager, T. et al.: "The "liquid computer": A novel strategy for real-time computing on time series", Special Issue on Foundations of Information Processing of Telematik, vol. 8, No. 1, 2002, pp. 39-43, XP002466253.

Morad, T.Y. et al.: "Performance, Power Efficiency and Scalability of Asymmetric Cluster Chip Multiprocessors", Computer Architecture Letters, vol. 4, Jul. 4, 2005 (Jul. 4, 2005), pp. 1-4, XP002466254.

Chuan-Yu Cho, et al., "Efficient Motion-Vector-Based Video Search Using Query by Clip", 2004, IEEE, Taiwan, pp. 1-4.

Gomes et al., "Audio Watermaking and Fingerprinting: For Which Applications?" University of Rene Descartes, Paris, France, 2003.

Ihab Al Kabary, et al., "SportSense: Using Motion Queries to Find Scenes in Sports Videos", Oct. 2013, ACM, Switzerland, pp. 1-3.

Jianping Fan et al., "Concept-Oriented Indexing of Video Databases: Towards Semantic Sensitive Retrieval and Browsing", IEEE, vol. 13, No. 7, Jul. 2004, pp. 1-19.

Nam, et al., "Audio Visual Content-Based Violent Scene Characterization", Department of Electrical and Computer Engineering, Minneapolis, MN, 1998, pp. 353-357.

Shih-Fu Chang, et al., "VideoQ: A Fully Automated Video Retrieval System Using Motion Sketches", 1998, IEEE New York, pp. 1-2.

Wei-Te Li et al., "Exploring Visual and Motion Saliency for Automatic Video Object Extraction", IEEE, vol. 22, No. 7, Jul. 2013, pp. 1-11.

Zhu et al., Technology-Assisted Dietary Assessment. Computational Imaging VI, edited by Charles A. Bauman, Eric L. Miller, Ilya Pollak, Proc. of SPIE-IS&T Electronic Imaging, SPIE vol. 6814, 681411, Copyright 2008 SPIE-IS&T. pp. 1-10.

Semizarov et al. "Specificity of Short Interfering RNA Determined through Gene Expression Signatures", PNAS, 2003, pp. 6347-6352.

Boari et al, "Adaptive Routing for Dynamic Applications in Massively Parallel Architectures", 1995 IEEE, Spring 1995.

Cococcioni, et al, "Automatic Diagnosis of Defects of Rolling Element Bearings Based on Computational Intelligence Techniques", University of Pisa, Pisa, Italy, 2009.

Emami, et al, "Role of Spatiotemporal Oriented Energy Features for Robust Visual Tracking in Video Surveillance, University of Queensland", St. Lucia, Australia, 2012.

(56) References Cited

OTHER PUBLICATIONS

Foote, Jonathan, et al. "Content-Based Retrieval of Music and Audio", 1997 Institute of Systems Science, National University of Singapore, Singapore (Abstract).

Garcia, "Solving the Weighted Region Least Cost Path Problem Using Transputers", Naval Postgraduate School, Monterey, California, Dec. 1989.

Guo et al, "AdOn: An Intelligent Overlay Video Advertising System", SIGIR, Boston, Massachusetts, Jul. 19-23, 2009.

Mandhaoui, et al, "Emotional Speech Characterization Based on Multi-Features Fusion for Face-to-Face Interaction", Universite Pierre et Marie Curie, Paris, France, 2009.

Marti, et al, "Real Time Speaker Localization and Detection System for Camera Steering in Multiparticipant Videoconferencing Environments", Universidad Politecnica de Valencia, Spain, 2011.

Mei, et al., "Contextual In-Image Advertising", Microsoft Research Asia, pp. 439-448, 2008.

Mei, et al., "VideoSense—Towards Effective Online Video Advertising", Microsoft Research Asia, pp. 1075-1084, 2007.

Nagy et al, "A Transputer, Based, Flexible, Real-Time Control System for Robotic Manipulators", UKACC International Conference on Control '96, Sep. 2-5, 1996, Conference 1996, Conference Publication No. 427, IEE 1996.

Ribert et al. "An Incremental Hierarchical Clustering", Visicon Interface 1999, pp. 586-591.

Scheper et al, "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.

Theodoropoulos et al, "Simulating Asynchronous Architectures on Transputer Networks", Proceedings of the Fourth Euromicro Workshop on Parallel and Distributed Processing, 1996. PDP '96.

Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.

Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.

Cernansky et al., "Feed-forward Echo State Networks"; Proceedings of International Joint Conference on Neural Networks, Montreal, Canada, Jul. 31-Aug. 4, 2005.

Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.

Freisleben et al., "Recognition of Fractal Images Using a Neural Network", Lecture Notes in Computer Science, 1993, vol. 6861, 1993, pp. 631-637.

Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.

Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.

Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

Howlett et al., "A Multi-Computer Neural Network Architecture in a Virtual Sensor System Application", International Journal of Knowledge-based Intelligent Engineering Systems, 4 (2). pp. 86-93, 133N 1327-2314.

Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.

Maass, W. et al.: "Computational Models for Generic Cortical Microcircuits", Institute for Theoretical Computer Science, Technische Universitaet Graz, Graz, Austria, published Jun. 10, 2003.

International Search Report for the related International Patent Application PCT/IL2006/001235; dated Nov. 2, 2008.

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

International Search Authority: "Written Opinion of the International Searching Authority" (PCT Rule 43bis.1) including International Search Report for the related International Patent Application No. PCT/US2008/073852; dated Jan. 28, 2009.

Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.

International Search Authority: International Preliminary Report on Patentability (Chapter I of the Patent Cooperation Treaty) including "Written Opinion of the International Searching Authority" (PCT Rule 43bis. 1) for the related International Patent Application No. PCT/IL2006/001235; dated Jul. 28, 2009.

Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.

Gong, et al., "A Knowledge-based Mediator for Dynamic Integration of Heterogeneous Multimedia Information Sources", Video and Speech Processing, 2004, Proceedings of 2004 International Symposium on Year: 2004, pp. 167-470, DOI: 10.1109/ISIMP.2004.1434102 IEEE Conference Publications, Hong Kong.

Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.

Lin, et al., "Robust Digital Signature for Multimedia Authentication: A Summary", IEEE Circuits and Systems Magazine, 4th Quarter 2003, pp. 23-26.

Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.

Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/ TMM.2014.2359332 IEEE Journals & Magazines.

May et al., "The Transputer", Springer-Verlag, Berlin Heidelberg, 1989, teaches multiprocessing system.

Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publications.

Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/ MMSP.2012.6343465, Czech Republic.

Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.

Vailaya, et al., "Content-Based Hierarchical Classification of Vacation Images," I.E.E.E.: Multimedia Computing and Systems, vol. 1, 1999, East Lansing, MI, pp. 518-523.

Vallet, et al., "Personalized Content Retrieval in Context Using Ontological Knowledge," IEEE Transactions on Circuits and Systems for Video Technology, vol. 17, No. 3, Mar. 2007, pp. 336-346.

Wang et al. "A Signature for Content-based Image Retrieval Using a Geometrical Transform", ACM 1998, pp. 229-234.

Whitby-Strevens, "The Transputer", 1985 IEEE, Bristol, UK.

(56) References Cited

OTHER PUBLICATIONS

Yanai, "Generic Image Classification Using Visual Knowledge on the Web," MM'03, Nov. 2-8, 2003, Tokyo, Japan, pp. 167-176.
Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.
IPO Examination Report under Section 18(3) for corresponding UK application No. GB1001219.3, dated Sep. 12, 2011.
Lin, C.; Chang, S.: "Generating Robust Digital Signature for Image/Video Authentication", Multimedia and Security Workshop at ACM Mutlimedia '98; Bristol, U.K., Sep. 1998; pp. 49-54.
Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.
Queluz, "Content-Based Integrity Protection of Digital Images", SPIE Conf. on Security and Watermarking of Multimedia Contents, San Jose, Jan. 1999, pp. 85-93, downloaded from http://proceedings.spiedigitallibrary.org/ on Aug. 2, 2017.
Schneider, et. al., "A Robust Content Based Digital Signature for Image Authentication", Proc. ICIP 1996, Laussane, Switzerland, Oct. 1996, pp. 227-230.

* cited by examiner

METHODS FOR IDENTIFYING RELEVANT METADATA FOR MULTIMEDIA DATA OF A LARGE-SCALE MATCHING SYSTEM

CROSS-REFERENCE TO RELATED APPLICATIONS

This application is a continuation-in-part of:
(1) U.S. patent application Ser. No. 12/084,150 filed on Apr. 25, 2008, now pending, which is the National Stage of International Application No. PCT/IL2006/001235, filed on Oct. 26, 2006, which claims foreign priority from Israeli Application No. 171577 filed on Oct. 26, 2005 and Israeli Application No. 173409 filed on 29 Jan. 2006; and
(2) U.S. patent application Ser. No. 12/195,863, filed Aug. 21, 2008, now pending, which claims priority under 35 USC 119 from Israeli Application No. 185414, filed on Aug. 21, 2007, and which is also a continuation-in-part of the above-referenced U.S. patent application Ser. No. 12/084,150.

All of the applications referenced above are herein incorporated by reference.

TECHNICAL FIELD

The invention relates to search of multimedia content, and more specifically to searching for metadata for the purposes of associating the metadata with a given multimedia content.

BACKGROUND OF THE INVENTION

With the abundance of multimedia data made available through various means in general and the Internet and world-wide web (WWW) in particular, there is a need for effective ways of searching for such multimedia data. Searching for multimedia data in general and video data in particular may be challenging at best due to the huge amount of information that needs to be checked. Moreover, when it is necessary to find a specific content of video, prior art cases revert to various metadata that textually describe the content of the multimedia data. However, such content may be abstract and complex by nature and not necessarily adequately defined by the metadata.

The rapidly increasing multimedia databases, accessible for example through the Internet, calls for the application of effective means for search-by-content. Searching for multimedia in general and for video data in particular is challenging due to the huge amount of information that has to be classified. Moreover, prior art techniques revert to model-based methods to define and/or describe multimedia data. However, by its very nature, the structure of such multimedia data may be too abstract and/or complex to be adequately represented by means of metadata. The difficulty arises in cases where the target sought for multimedia data cannot be adequately defined in words, or respective metadata of the multimedia data. For example, it may be desirable to locate a car of a particular model in a large database of video clips or segments. In some cases the model of the car would be part of the metadata but in many cases it would not. Moreover, the car may be at angles different from the angles of a specific photograph of the car that is available as a search item. Similarly, if a piece of music, as in a sequence of notes, is to be found, it is not necessarily the case that in all available content the notes are known in their metadata form, or for that matter, the search pattern may just be a brief audio clip.

A system implementing a computational architecture (hereinafter "the Architecture") that is based on a PCT patent application publication number WO 2007/049282 and published on May 3, 2007, entitled "A Computing Device, a System and a Method for Parallel Processing of Data Streams", assigned to common assignee, and is hereby incorporated by reference for all the useful information it contains. Generally, the Architecture consists of a large ensemble of randomly, independently, generated, heterogeneous processing cores, mapping in parallel data-segments onto a high-dimensional space and generating compact signatures for classes of interest.

A vast amount of multimedia content exists today, whether available on the web or on private networks, having partial or full metadata that describes the content. When new content is added it is a challenge to provide metadata that is accurate because of the plurality of metadata that may be potentially associated with a multimedia data element. Trying to do so manually is a tedious task and impractical for the amount of multimedia content being generated daily.

It would be therefore advantageous to provide a solution to overcome the limitations of the prior art described hereinabove.

SUMMARY OF THE INVENTION

Certain embodiments of the invention include a framework, a method, a system and respective technological implementations and embodiments, for automatically and accurately associating to newly added multimedia content metadata existing in the context of previously stored multimedia content.

One embodiment of the invention includes a method for identifying and associating metadata to input multimedia data elements. The method comprises comparing an input first multimedia data element to at least a second multimedia data element; collecting metadata of at least said second multimedia data element when a match is found between said first multimedia data element and at least said second multimedia data element; associating at least a subset of said collected metadata to said first multimedia data element; and storing said first multimedia data element and said associated metadata in a storage.

Another embodiment of the invention includes a system for collecting metadata for a first multimedia data element. The system comprises a plurality of computational cores enabled to receive the first multimedia data element, each core having properties to be independently of each other core, each generate responsive to the first multimedia data element a first signature element and a second signature element, said first signature element being a robust signature; a storage unit for storing at least a second multimedia data element, metadata associated with said second multimedia data element, and at least one of a first signature and a second signature associated with said second multimedia data element, said first signature being a robust signature; and a comparison unit for comparing signatures of multimedia data elements coupled to said plurality of computational cores and further coupled to said storage unit for the purpose of determining matches between multimedia data elements; wherein responsive to receiving the first multimedia data element said plurality of computational cores generate a respective first signature of said first multimedia data element and/or a second signature of said first multimedia data element, for the purpose of determining a match with at least a second multimedia data element stored in said storage and associating metadata associated with said at least second multimedia data element with the first multimedia data element.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION OF THE INVENTION

Figure 1:
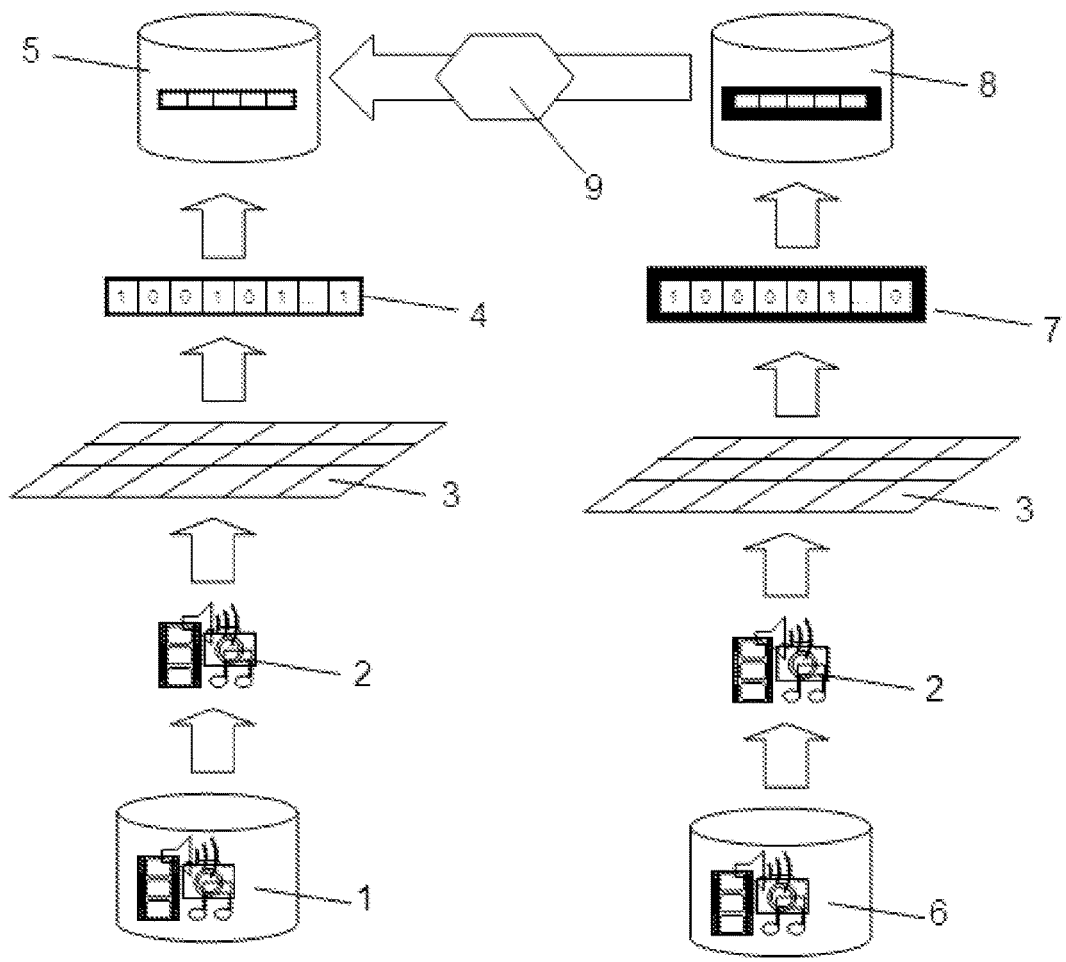
FIG. 1 is a block diagram depicting the basic flow of information in The System in large-scale video matching.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

A method implemented according to an embodiment of the invention enables to associate metadata to a multimedia content based on finding matches to similar multimedia content. An input given multimedia content is matched to at least another multimedia content with corresponding metadata. Upon determination of a match, the corresponding metadata is used as metadata of the given multimedia content. When a large number of multimedia data is compared a ranked list of metadata is provided. The most appropriate metadata is associated to the input given multimedia content based on various criteria. The method can be implemented in any applications which involve large-scale content-based clustering, recognition and classification of multimedia data, such as, content-tracking, video filtering, multimedia taxonomy generation, video fingerprinting, speech-to-text, audio classification, object recognition, video search and any other application requiring content-based signatures generation and matching for large content volumes such as, web and other large-scale databases.

Certain embodiments of the invention include a framework, a method, a system and their technological implementations and embodiments, for large-scale matching-based multimedia Deep Content Classification (DCC). In accordance with an embodiment of the invention the system is based on the Architecture which is an implementation of a computational architecture described in patent application publication number WO 2007/049282. As mentioned above, the Architecture consists of a large ensemble of randomly, independently, generated, heterogeneous processing computational cores, mapping in parallel data-segments onto a high-dimensional space and generating compact signatures for classes of interest.

In accordance with the principles of the invention, a realization of The Architecture embedded in large-scale video matching system (hereinafter "the Matching System") for multimedia DCC is disclosed. The Architecture receives an input stream of multimedia content segments, injected in parallel to all computational cores. The computational cores generate compact signatures of a specific content segment, and/or of a certain class of equivalence and interest of content-segments. For large-scale volumes of data, the signatures are stored in a conventional way in a database of size N, allowing match between the generated signatures of a certain content-segment and the signatures stored in the database, and accomplishing it in a low-cost, in terms of complexity, i.e. $\leq O(\log N)$, and response time.

An embodiment of the Matching System used for the purpose of explaining the principles of the invention there is now demonstrated. Other embodiments are described in the patent applications of which this patent application is a continuation-in-part of, and are specifically incorporated herein by reference. Moreover, it is appreciated that other embodiments will be apparent to one of ordinary skill in the art.

Characteristics and advantages of the Matching System include but are not limited to: the Matching System is flat and generates signatures at an extremely high throughput rate; the Matching System generates robust natural signatures, invariant to various distortions of the signal; the Matching System is highly-scalable in high-volume signatures generation; the Matching System is highly scalable in matching against large volumes of signatures; the Matching System generates Robust Signatures for exact match with low cost, in terms of complexity and response time; the Matching System accuracy is scalable versus the number of computational cores, with no degradation effect on the throughput rate of processing; the throughput of the Matching System is scalable with the number of computational threads, and is scalable with the platform for computational cores implementation, such as FPGA, ASIC, etc.; and, the Robust Signatures produced by the Matching System are task-independent, thus the process of classification, recognition and clustering can be done independently from the process of signatures generation, in the superior space of the generated signatures.

The goal of the Matching System is to find effectively matches between members of a large scale Master Database (DB) of video content-segments and a large scale Target DB of video content-segments. The match between two video content segments should be invariant to a certain set of statistical distortions performed independently on two relevant content-segments. Moreover, the process of matching between a certain content-segment from the Master DB to the Target DB consisting of N segments, cannot be done by matching directly the Master content-segment to all N Target content-segments, for large-scale N, since the corresponding complexity of O(N), will lead to non-practical response time. Thus, the representation of content-segments by both Robust Signatures and Signatures is crucial application-wise. The Matching System embodies a specific realization of the Architecture for large scale video matching purposes.

A high-level description of the process for large scale video matching performed by the Matching System is depicted in FIG. 1. Video content segments 2 from a Master DB 6 and a Target DB 1 are processed in parallel by a large number of independent computational Cores 3 that constitute the Architecture. Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 2. Finally, Target Robust Signatures and/or Signatures are effectively matched, by a matching algorithm 9, to Master Robust Signatures and/or Signatures database to find all matches between the two databases.

To demonstrate an example of signature generation process, it is assumed, merely for the sake of simplicity and without limitation on the generality of the invention, that the signatures are based on a single frame, leading to certain simplification of the computational cores generation. The Matching System is extensible for signatures generation capturing the dynamics in-between the frames.

Figure 2:
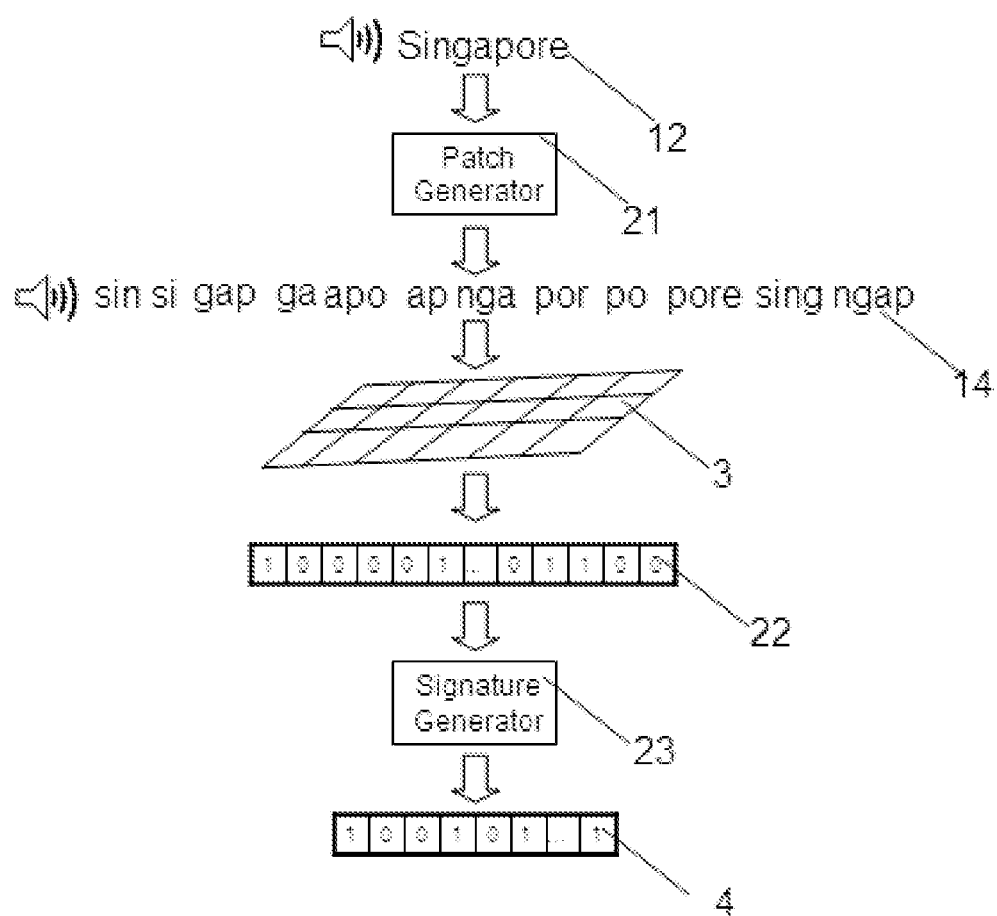
FIG. 2 is a diagram showing the flow of patches generation, response vector generation, and signature generation in a Large-Scale Speech-to-Text System implemented in accordance with certain embodiments of the invention.

The signatures generation process will be described with reference to FIG. 2. The first step in the process of signatures generation from a given speech-segment is to break-down the speech-segment to K patches 14 of random length P and random position within the speech segment 12. The break-down is performed by the patch generator component 21. The value of K and the other two parameters are determined based on optimization, considering the tradeoff between accuracy rate and the number of fast matches required in the flow process of the System. In the next step, all the K patches are injected in parallel to all L computational Cores 3 to generate K response vectors 22.

In order to generate Robust Signatures, i.e., Signatures that are robust to additive noise L (where L is an integer equal to or greater than 1) computational cores are utilized in the Matching System. A frame i is injected into all the Cores. The Cores generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i = \{n_i\}$ ($1 \leq i \leq L$) may consist of a single leaky integrate-to-threshold unit (LTU) node or more nodes. The node $n_i$ equations are:

$$V_i = \sum_j w_{ij} k_j$$

$n_i = \theta(V_i - Th_x)$; $\theta$ is a Heaviside step function; $w_{ij}$ is a coupling node unit (CNU) between node i and image component j (for example, grayscale value of a certain pixel j); $k_j$ is an image component j (for example, grayscale value of a certain pixel j); $Th_x$ is a constant Threshold value, where x is 'S' for Signature and 'RS' for Robust Signature; and $V_i$ is a Coupling Node Value.

The Threshold values $Th_x$ are set differently for Signature generation and for Robust Signature generation. For example, for a certain distribution of $V_i$ values (for the set of nodes), the thresholds for Signature (ThS) and Robust Signature (ThRS) are set apart, after optimization, according to at least one or more of the following criteria:

For: $V_i > Th_{RS}$ $$1 - p(V > Th_S) = 1 - (1-\epsilon)^l \ll 1 \qquad \text{I:}$$

i.e., given that I nodes (cores) constitute a Robust Signature of a certain image I, the probability that not all of these I nodes will belong to the Signature of same, but noisy image, $\tilde{I}$ is sufficiently low (according to a system's specified accuracy).

$$p(V_i > Th_{RS}) \approx l/L \qquad \text{II:}$$

i.e., approximately 1 out of the total L nodes can be found to generate Robust Signature according to the above definition.

III: Both Robust Signature and Signature are generated for certain frame i.

It should be understood that the creation of a signature is a unidirectional compression where the characteristics of the compressed data are maintained but the compressed data cannot be reconstructed. Therefore, a signature can be used for the purpose of comparison to another signature without the need of comparison of the original data. The detailed description of the signature generation is discussed in more detail in the pending patent applications of which this patent application is a continuation-in-part of, and are hereby incorporated by reference.

Computational Core generation is a process of definition, selection and tuning of the Architecture parameters for a certain realization in a specific system and application. The process is based on several design considerations, such as:

(a) The Cores should be designed so as to obtain maximal independence, i.e. the projection from a signal space should generate a maximal pair-wise distance between any two cores' projections into a high-dimensional space.

(b) The Cores should be optimally designed for the type of signals, i.e. the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to set of signal distortions, of interest in relevant application.

Figure 3:
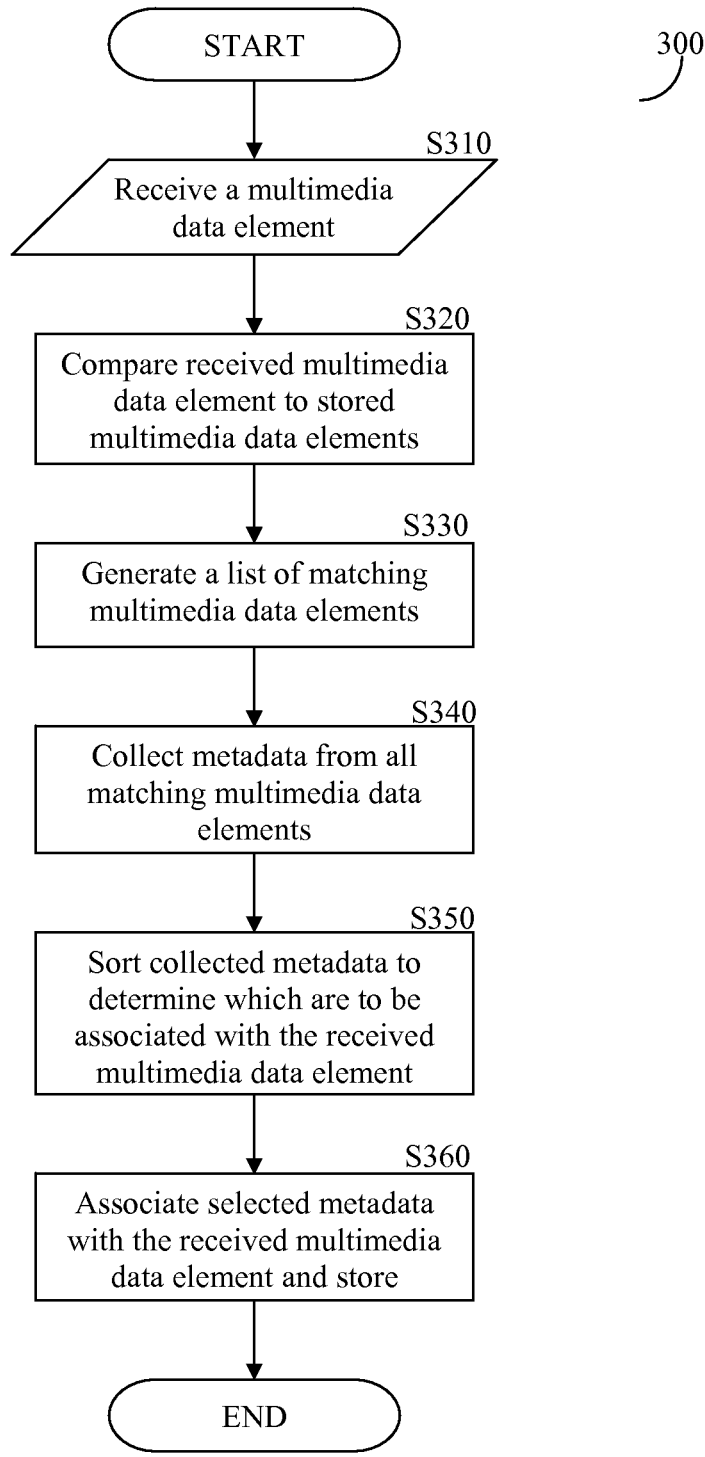
FIG. 3 is a flowchart of metadata extraction for the benefit of a given multimedia content using The System.

FIG. 3 shows an exemplary and non-limiting flowchart 300 describing a method for identifying and associating metadata suitable for a given input multimedia data element implemented in accordance with an embodiment of the invention. A multimedia data element may be, but is not limited to, a video, a video frame, a video clip, an image, an audio recording, and other kinds of multimedia data elements. A multimedia data element may further include images of signals, such as medical signals, geophysical signals, subsonic signals, ultrasonic signals, electromagnetic signal, infrared signals, and the likes. It should be further noted that a received multimedia data element may also be a portion of a full image. For example, and without limitation the scope of the invention, a logo that is shown on certain television shows, or a cartoon character used in a movie, and the likes, may be recognized as a multimedia data element.

In S310 a multimedia data element is received, referred to herein also as the given multimedia data element. In S320 the given multimedia data element is compared to previously stored multimedia data elements. In one embodiment of the disclosed invention, the Matching System receives the given multimedia data element and generates the signatures. Comparison is then performed against the stored signatures of the multimedia data elements by the Matching System. In S330 a list of matched multimedia data elements of the previously stored data elements is generated. In S340 the metadata associated with all the matched multimedia data elements is collected.

Figure 4:
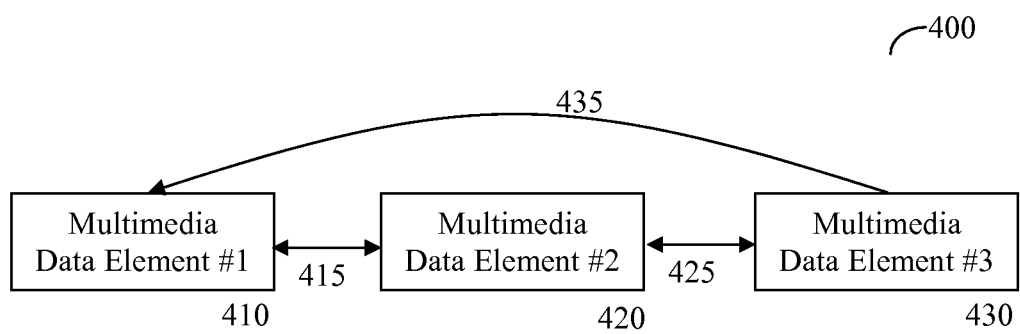
FIG. 4 is an exemplary chart of an extraction of metadata based on matching in accordance with the principles of the invention.

Reference is now made to FIG. 4 that shows an exemplary and non-limiting chart 400 of an extraction of metadata based on matching in accordance with one embodiment of the invention. A multimedia data element 410, which is the given multimedia data element, is found to match 415 with a multimedia data element 420. Therefore, at least a portion of the metadata associated with the multimedia data element 420 will now be associated with the multimedia data element 410. However, it is also shown that the multimedia data element 420 has previously matched 425 to a multimedia data element 430. Although the multimedia data element 410 did not match directly with the multimedia data element 430, for the purpose of metadata extraction, a match 435 is considered to be reached, and therefore at least a portion of the metadata associated with multimedia data element 430 will be also associated with multimedia data element 410.

Referring now back to FIG. 3, in S350 it is determined which components of the metadata is relevant to the received multimedia data element. In accordance with one embodiment the determination may be performed by ranking the frequency of each component of the metadata collected and selecting those components that appear in a frequency greater than a predetermined threshold. In S360 the metadata determined to be relevant to the received multimedia data element are associated with each other and stored. In one embodiment of the invention the received multimedia data element and its newly associated metadata are stored in a database of the Matching System. In yet another embodiment of the disclosed invention one or more subsets of metadata are associated with the given multimedia data element.

Following is a non-limiting example for the operation of the method implemented in accordance with the invention. An image containing a picture of the Statue of Liberty is fed to the Matching System with or without associated metadata. The received picture is compared now with the database of multimedia data elements, preferably of the type picture, and there will be typically found many matches to this input. As noted above, in one embodiment, the signatures are generated, i.e., the Signature and the Robust Signature, for the received picture, and those signatures are compared to the previously stored signatures. The comparison may result in many matches. Their associated metadata are then used to determine those metadata components which are relevant to the input picture. It should be noted that the Matching System may further determine more than the match to the Statue of Liberty. The given image may also contain a cruise boat that regularly approaches the Statue of Liberty. The boat may be recognized by using the method of the invention when comparing sub-areas of the image and thereby being able to provide metadata also to that element of the given image. Similarly, if a particular bird is captured as part of the scene, for example, a seagull, then metadata characterizing images of seagulls may be added.

The principles of the invention are implemented as hardware, firmware, software or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What we claim is:

1. A method for identifying and associating metadata to input multimedia data elements, comprising:
   comparing an input first multimedia data element to at least one second multimedia data element by generating for each of said input first multimedia data element and said at least one second multimedia data element a first signature and a second signature, said first signature is a robust signature, and comparing between at least a first signature of said first multimedia data element and at least one of a first signature and a second signature of said at least one second multimedia data element;
   collecting metadata of said at least one second multimedia data element when a match is found between said first multimedia data element and said at least one second multimedia data element;
   associating, when said match is found between said first multimedia data element and said at least one second multimedia data element, at least a subset of said collected metadata of said at least one second multimedia data element with said first multimedia data element; and
   storing said first multimedia data element and said associated metadata in a storage.

2. The method of claim 1, wherein said at least one second multimedia data element comprises a set of multimedia data elements.

3. The method of claim 1, wherein a multimedia data element is selected from the group consisting of an image, graphics, a video stream, a video clip, an audio stream, an audio clip, a video frame, a photograph, images of signals, combinations thereof, and portions thereof.

4. The method of claim 3, wherein said images of signals are images selected from the group consisting of medical signals, geophysical signals, subsonic signals, supersonic signals, electromagnetic signals, and infrared signals.

5. The method of claim 1, further comprising:
   comparing between at least a second signature of said first multimedia data element and at least one of a first signature and a second signature of said at least one second multimedia data element.

6. The method of claim 1, wherein said comparing is performed on a plurality of computational cores, which each of said computation cores is configured to receive said first multimedia data element.

7. The method of claim 6, further comprising:
setting properties of each of said plurality of computational cores to be independently of each other core.

8. The method of claim 1, wherein associating said at least subset of said collected metadata to said first multimedia data element further comprising:
sorting said collected metadata; and
associating a subset of components of said collected metadata that is above a predetermined threshold as metadata for said first multimedia data element.

9. The method of claim 1, further comprising:
selecting a first metadata from said at least a subset of said collected metadata;
searching for at least a third multimedia data element having said first metadata;
comparing said first multimedia element to said third multimedia element;
collecting metadata associated with said third multimedia data element if a match is found between said first multimedia data element and said third multimedia data element; and
adding said metadata associated with said third multimedia data element to metadata of said first multimedia data element.

10. The method of claim 9, wherein comparing said first multimedia element to said third multimedia element further comprising:
generating for said third multimedia data element a first signature and a second signature, said first signature is a robust signature; and
comparing between at least a first signature of said first multimedia data element and at least one of a first signature and a second signature of said third multimedia data element.

11. The method of claim 9, wherein comparing said first multimedia element to said third multimedia element further comprising:
comparing between at least a second signature of said first multimedia data element and at least one of: a first signature and a second signature of said third multimedia data element.

12. A system for collecting metadata for a first multimedia data element, comprising:
a plurality of computational cores configured to receive the first multimedia data element, each core having properties to be independent of each other core, each said core generates responsive to the first multimedia data element a first signature element and a second signature element, said first signature element is a robust signature;
a storage unit for storing at least one second multimedia data element, metadata associated with said second multimedia data element, and at least one of a first signature and a second signature associated with said second multimedia data element, said first signature is a robust signature; and
a comparison unit coupled to said plurality of computational cores and to said storage unit, wherein the comparison unit is configured to compare signatures of multimedia data elements for the purpose of determining matches between multimedia data elements;
wherein responsive to receiving the first multimedia data element said plurality of computational cores generate a respective first signature of said first multimedia element and a second signature of said first multimedia data element, for the purpose of determining a match with said at least one second multimedia data element stored in said storage and associating at least a subset of metadata associated with said at least one second multimedia data element with said first multimedia data element.

13. The system of claim 12, wherein said multimedia data element is selected from the group consisting of an image, graphics, a video stream, a video clip, an audio stream, an audio clip, a video frame, a photograph, images of signals, a combinations thereof, and portions thereof.

14. The system of claim 12, wherein said images of signals are images selected from the group consisting of medical signals, geophysical signals, subsonic signals, supersonic signals, electromagnetic signals, and infrared signals.

15. The system of claim 12, wherein said comparison unit compares between at least a first signature of said first multimedia data element and at least one of: a first signature and a second signature of said at least one second multimedia data element.

16. The system of claim 12, wherein said comparison unit compares between at least the second signature of said first multimedia data element and at least one of: a first signature and a second signature of said at least one second multimedia data element.

17. The system of claim 12, said system configured to sort metadata collected from said at least one second multimedia data element for using a subset of said collected metadata that is above a predetermined threshold as metadata for said first multimedia data element.

18. The system of claim 12, said system is further configured to select a first metadata from said at least a subset of said collected metadata, search for at least a third multimedia data element having said first metadata, compare said first multimedia element to said third multimedia element, collect metadata associated with said third multimedia data element if a match is found between said first multimedia data element and said third multimedia data element, and add said metadata associated with said third multimedia data element to metadata of said first multimedia data element.

19. The system of claim 18, wherein said system is configured to compare said first multimedia element to said third multimedia element by comparing between at least the first signature of said first multimedia data element and at least one of: a first signature and a second signature of said at least third multimedia data element.

20. The system of claim 18, wherein said system is configured to compare said first multimedia element to said third multimedia element by comparing between at least a second signature of said first multimedia data element and at least one of: a first signature and a second signature of said at least third multimedia data element.

21. A non-transitory computer readable medium having stored thereon computer executable code when executed causing a processor to perform the process of identifying and associating metadata to input multimedia data elements, comprising:
comparing an input first multimedia data element to at least one second multimedia data element by generating for each of said input first multimedia data element and said at least one second multimedia data element a first signature and a second signature, said first signature is a robust signature, and comparing between at least a first signature of said first multimedia data element and at least one of a first signature and a second signature of said at least one second multimedia data element;

collecting metadata of said at least one second multimedia data element when a match is found between said first multimedia data element and said at least one second multimedia data element;

associating at least a subset of said collected metadata with said first multimedia data element; and storing said first multimedia data element and said associated metadata in a storage.

* * * * *